April 15, 1930.  J. S. GULLBORG  1,754,512
SPOTLIGHT
Filed March 15, 1928   4 Sheets-Sheet 1
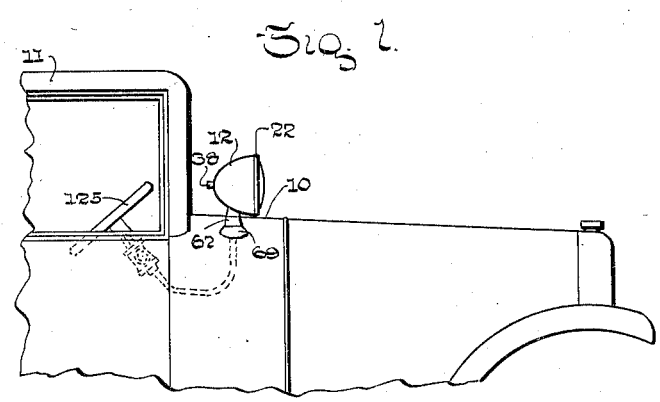
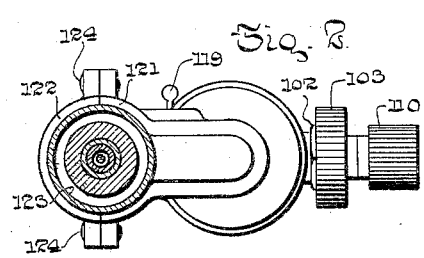
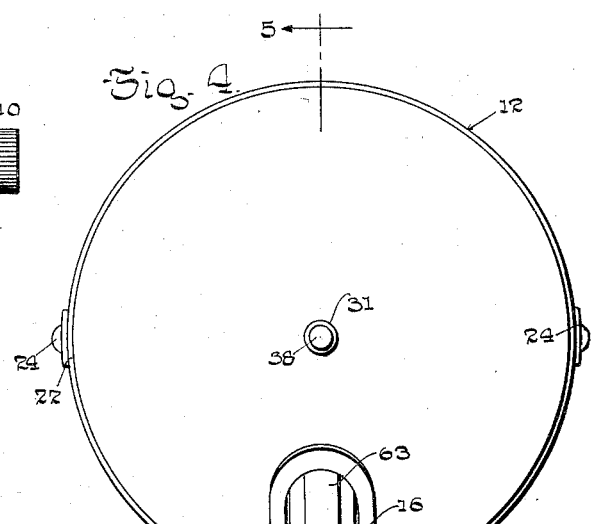
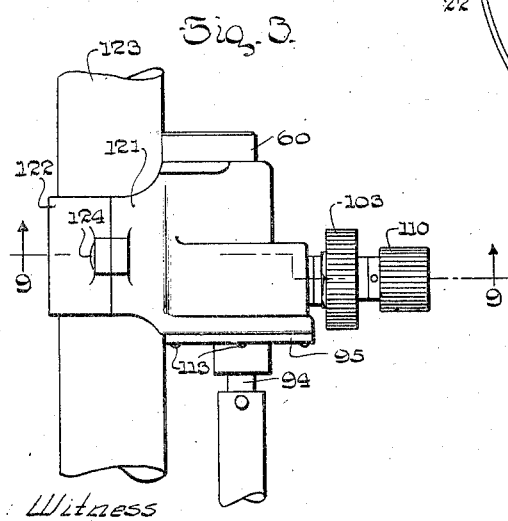
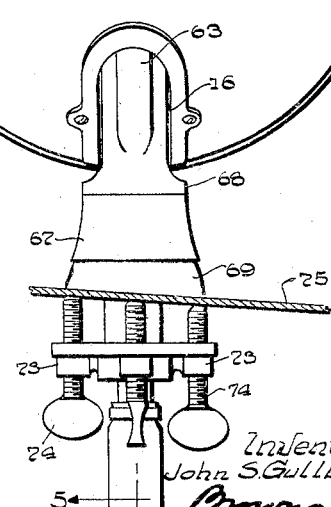

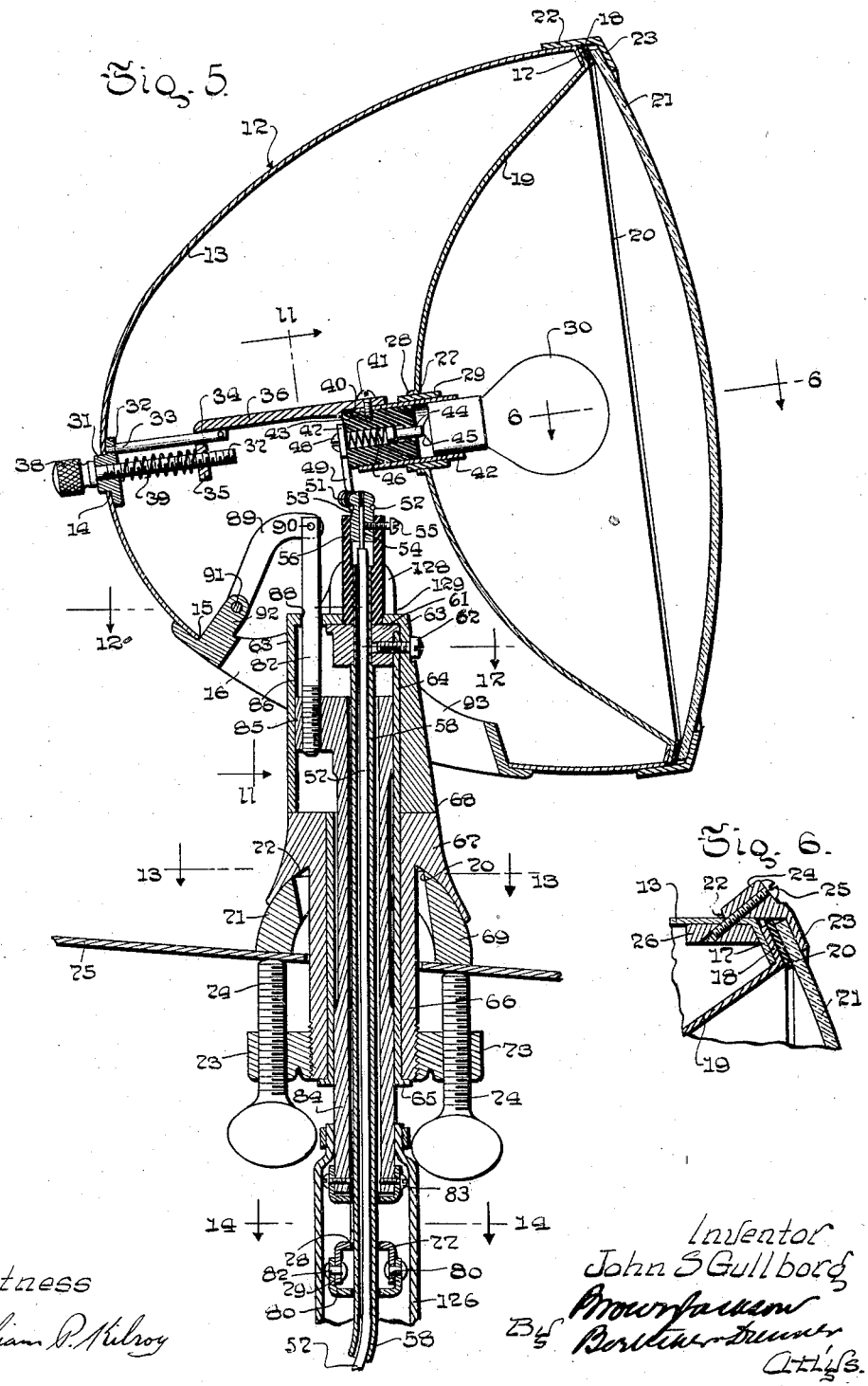

April 15, 1930.  J. S. GULLBORG  1,754,512
SPOTLIGHT
Filed March 15, 1928   4 Sheets-Sheet 3
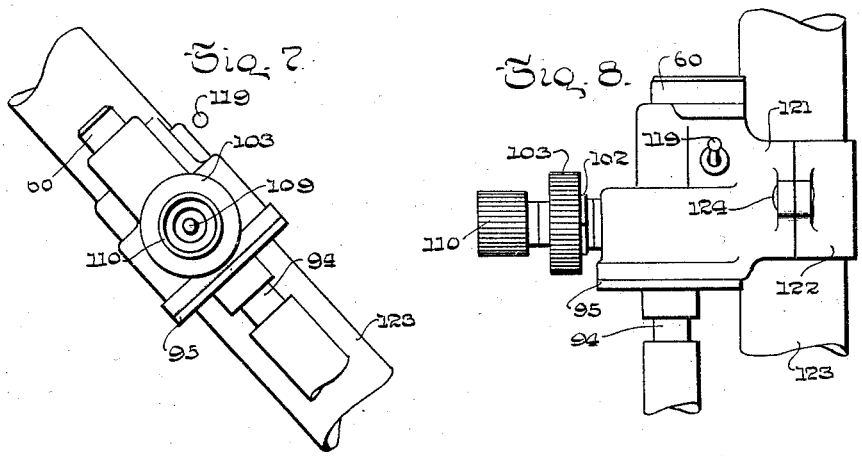
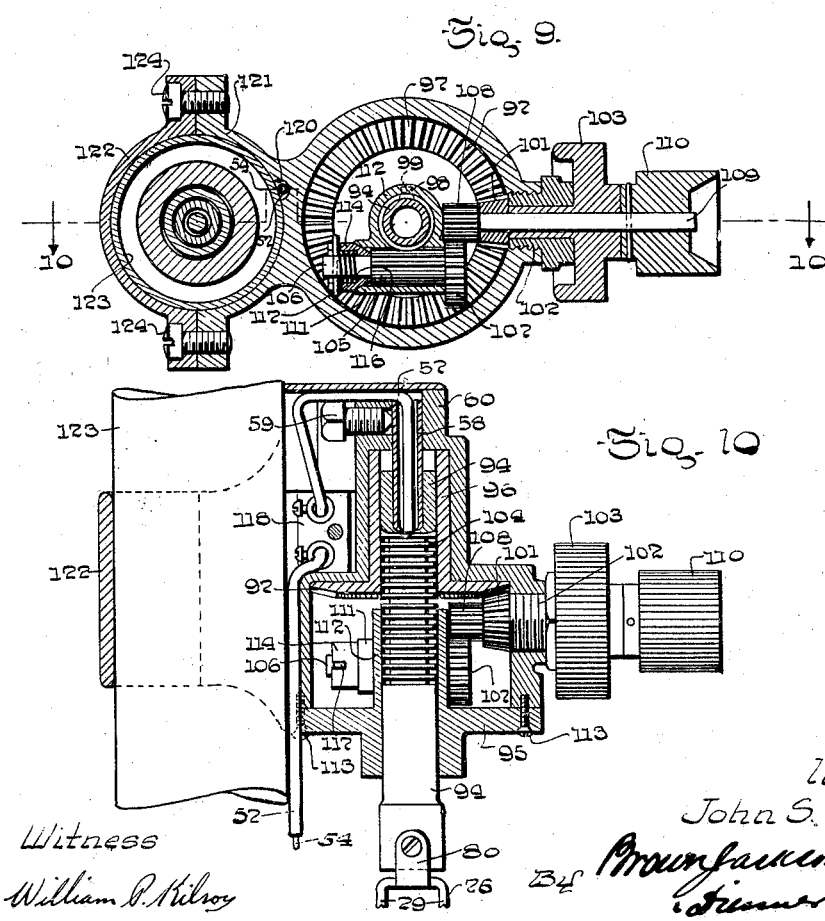

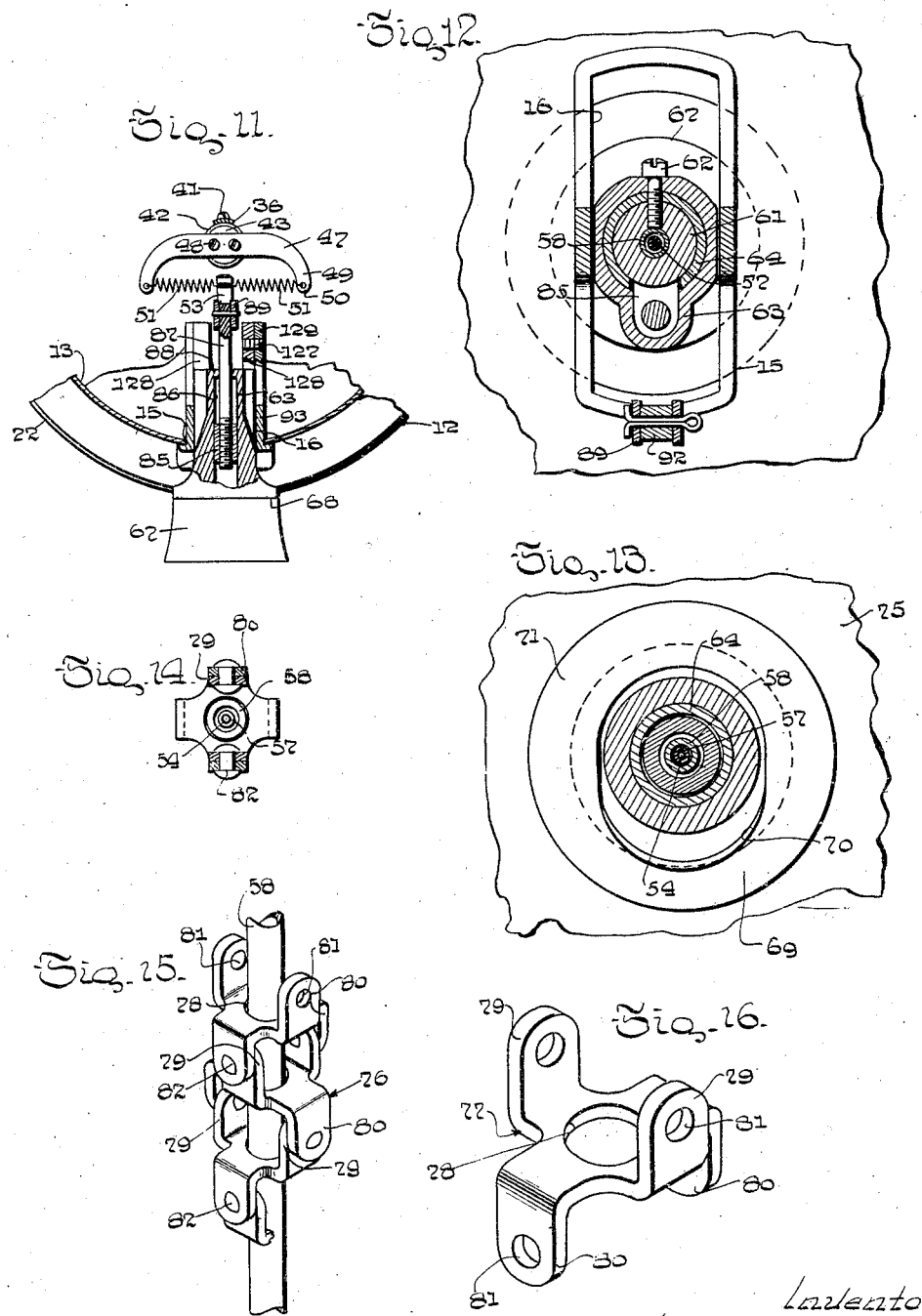

Patented Apr. 15, 1930

1,754,512

UNITED STATES PATENT OFFICE

JOHN S. GULLBORG, OF CHICAGO, ILLINOIS, ASSIGNOR TO ALEMITE DIE CASTING & MFG. CO., OF WOODSTOCK, ILLINOIS, A CORPORATION OF ILLINOIS

SPOTLIGHT

Application filed March 15, 1928. Serial No. 261,725.

This invention relates to a spotlight or lamp particularly adapted for use on an automobile and the object of my invention is to provide an improved lamp of this character comprising improved means for moving the lamp so as to adjust a beam of light through a vertical plane and other means for rotating the lamp on a vertical axis. My invention also comprises novel means for maintaining an electric circuit through the lamp bulb regardless of the amount and direction of the movement of the lamp.

It is another object of my invention to provide a universal adjusting means whereby the lamp may be mounted on an automobile cowl in a vertical position, even though the cowl may have a decided slope forwardly and sideways.

Heretofore a great many arrangements have been proposed whereby a lamp may be adjusted, for instance lamps have been mounted on brackets at the side of an automobile windshield and others have been mounted in an opening through the windshield but in these various arrangements the operation of the same was limited in extent and more or less cumbersome.

By the use of my invention, I propose to mount my lamp at any convenient place on the automobile cowl, and in such a position that light from the same may clearly illuminate the road or buildings and the like on either side of the road as may be desired. In order to obtain the most suitable mounted position for the lamp, I have devised a universal ball and socket joint and a cooperating clamping arrangement adapted to engage the inner side of the cowl for securing the lamp thereto in any adjusted position.

For the purpose of rotating the lamp, I provide a gearing arrangement within a housing which may be clamped about the steering column in a position convenient to the driver; preferably on the right hand side in order that the knurled knob by which it is operated will be readily accessible to the right hand of the driver.

Operatively connected with said gearing arrangement, I have provided a flexible tube extending to the lamp for rotating the same. In said gearing arrangement, I have incorporated a cylindrical rack operatively connected to suitable gearing and adapted to reciprocate the aforesaid flexible tube, when operated, and adapted to oscillate the lamp on a pivot in a vertical plane through the medium of the flexible tube.

For controlling the illumination of the lamp, I provide a suitable switch on the gear housing and pass an electric conductor through a relatively rigid tube which extends through the flexible tube to the lamp. On the lamp end of the conductor, I secure a terminal having an annular recess arranged to receive the inner ends of flexible conductors, the outer ends of which engage the ends of arms extending from the terminal of the socket in which the light bulb is removably secured.

By this arrangement, provision is made for a great amount of oscillation and rotation of the lamp without in any way interfering with the continued illumination of the lamp. Novel means for adjusting the lamp socket and means for securing the reflector and lens in position will be hereinafter described.

In order that those skilled in the art may have a thorough understanding of my invention and be able to construct and use the same, I show in the accompanying drawings, a specific illustration of my invention as embodied in a working model.

Fig. 1 is an elevational view of a portion of an automobile showing my invention applied thereto;

Fig. 2 is a plan view of the gear housing and and operating means;

Fig. 3 is a rear elevational view of the housing shown in Figure 2;

Fig. 4 is a rear elevation of the lamp showing the means for adjusting and clamping the same to the cowl;

Fig. 5 is a vertical section taken on the line 5—5 of Figure 4;

Fig. 6 is a fragmentary section showing means for securing the reflector and lens in position;

Figs. 7 and 8 are side and front elevations respectively of the housing shown in Figure 2;

Fig. 9 is a section taken on substantially the line 9—9 of Figure 3;

Fig. 10 is a sectional view taken substantially on the line 10—10 of Figure 9 and showing a portion of the rack in elevation;

Fig. 11 is a fragmentary view taken on the line 11—11 of Figure 5;

Fig. 12 is a sectional view taken on substantially the line 12—12 of Figure 5;

Fig. 13 is a sectional view taken on substantially the line 13—13 of Figure 5;

Fig. 14 is a cross section taken on the line 14—14 of Figure 5;

Fig. 15 is a perspective view of that shown in Figure 14; and

Fig. 16 is an enlarged perspective view of a single link of the flexible chain tube shown in Figure 15.

For most purposes it has been found desirable to mount a spotlight or dirigible lamp 12 on the cowl 10 of the automobile 11 in such a position that light may be directed in practically any direction, in some such manner as shown in Figure 1. By the use of my improved means for rotating and tilting the lamp, it is possible to locate the lamp in the most desirable position.

The lamp consists of a substantially parabolic casing 13 having a circular opening 14 in the rear portion through which the bulb adjusting means operates, and an enlarged opening 15 in the bottom portion, in which a casting 16 is fitted and suitably secured and through which the operating and mounting means extend. The forward edge of the casing is bent inwardly into a flange 17 on which a similar but outwardly turned flange 18 of the parabolic reflector 19 is seated. As best shown in Figure 6, a gasket or cushioning member 20 of cork or the like is positioned on the flange 18 and arranged to provide a rest for the edge of the lens 21, which is held in place thereon by ring 22 provided with a flange 23 for engaging the outer side of the lens at its edges. A plurality of tapered lugs 24 are suitably secured to the ring 22 and receive a set screw 25 through the same which has threaded engagement in reinforcing blade 26 on the inside of the casing 13, thereby providing a novel and effective means for securing the casing, reflector and lens from relatively moving when vibrated.

The central portion of the reflector is provided with an opening 27 having a rearwardly extending flange 28. A cylindrical member 29 is firmly pressed into the opening 27 and in engagement with the inner side of the flange 28 thereby forming a passageway through which the lamp socket may be adjusted for focusing the light bulb 30 as may be required. The rear opening 14 in the lamp casing is provided with a bushing 31 having a flange 32 engaging the inner side of the casing. Into an opening through the flange 32, a guide rod 33 is secured which also passes through an opening 34 in a downwardly turned portion 35 on the adjusting arm 36 and is provided with a transverse pin adjacent its inner end to prevent the arm 36 from being disengaged from the same.

A set screw 37 passes through the bushing 31 and is provided with a knurled head 38 by which it may be rotated for moving the arm 36 forwardly and backwardly by means of threaded engagement through the portion 35 of said arm. A coil spring 39 is fitted over the screw 37 and is interposed between the bushing 31 and the portion 35 of the arm 36 for constantly urging the arm 36 in a forwardly direction and taking up any lost motion. A tooth 40 on the arm 36 engages the rear side of the lamp socket and a screw 41 passes through the forward end of the arm and secures the same to the side of the lamp socket adjacent the rear end thereof.

The lamp socket comprises the sleeve 42 having a suitable insulating member 43 therein, which is provided with contact 44 engaging the contact 45 of the light bulb and yieldingly held in place by a spring 46 which receives electrical energy from the cross arm 47 held in contact therewith and on the rear end of the socket by screws 48 as best shown in Figure 11.

Horns 49 extend downwardly from arm 47 and have openings 50 for the accommodation of the ends of the coil spring 51, the other ends of which loosely engage in the annular groove 52 and the terminal 53, which is secured to the conductor 54 by set screw 55 passing through the cylinder 56 preferably of insulating material, as shown in Figure 5. The conductor 54 is insulated for the main portion of its length by suitable material 57 and the same passes through the substantially rigid tube 58 which has one end tightly fitted in the cylinder 56 and the other extends to and is secured in place by the set screw 59 in the gear casing 60 shown in Figure 10.

A collar 61 is loosely fitted on the lamp end of the rigid tube just beneath and adjacent the cylinder or insulator 56. A set screw 62 passes through the lamp pedestal 63, through the wall of the cylinder 64 and into the collar 61 for securing these members together, so that they rotate as a unit with the tube 58. The lower end of the cylinder 64 has a flange 65 engaging under the lower end of the downwardly extending tubular portion 66 of the socket 67 and adapted to hold the pedestal 63 on top of and in rotative engagement at 68 with the top of the socket member 67. A semi-spherical ball or shell 69 has a relatively large opening 70 therein adapted to loosely pass over the portion 66 of the socket and the outer convex surface 71 of the ball engages within the concave socket 72 for permitting universal adjustment on the ball and it will be noted that the opening 70 extends farther in one direction than the other so that the ball may be positioned on a relatively steep incline and the lamp may still be adjusted approximately equally in all directions or the ball may be so placed as to permit excessive adjustment in one direction.

A disc 73 is secured to the lower end of the tubular portion 66 by means of screw thread engagement therewith and the same is provided with a plurality of thumb screws 74 for holding the ball and socket down upon the cowl 75 in any desired adjusted position.

For the purpose of rotating and tilting the lamp while the car is being driven, I provide a flexible tube 76 composed of a plurality of blade members 77 which are formed as shown in Figure 16, of a piece of steel stamped out and pressed to shape and having a central opening 78 through which the rigid tube 58 closely fits for relative rotary motion with respect thereto. Upwardly extending ears 79 are so spaced as to fit within the spacing of a pair of downwardly extending ears 80 of a similar link. The ears 80 are spaced substantially 90 degrees from the ears 79 of the same link and extend in a direction parallel with the extension of the ears 79 as shown in Figures 15 and 16. All of the ears are provided with openings 81 through which rivets 82 are passed for securing the ears together, but the rivets are sufficiently loose to permit relative rotary motion of the ears in order that a rotary motion imparted to the link at one end of the flexible tube will be transmitted with practically no lost motion to the other end of the tube, regardless of the number of relatively sharp curves around which the flexible tube may be guided by the rigid tube onto which it is threaded.

The lamp end of the flexible tube 76 is secured by set screws 83 to the bottom end of the plunger 84 which is adapted to reciprocate in the cylinder 64 and impart rotary motion by means of the lug 85 on the side thereof to the pedestal 63 as best illustrated in Figure 12. It will be noted that the lug 85 may reciprocate in an internal recess 86 provided in the pedestal 63 but when it is rotated, it imparts motion to the pedestal since it sits relatively close within the recess. The lug 85 also extends out through a slot in the side of the cylinder 64 requiring the parts 63, 64 and 85 to rotate as a unit.

From the lug 85, a push rod 87 having threaded engagement therewith extends upwardly through the opening 88 in the top of the pedestal to a link 89 with which it has pivotal connections at 90. The other end of the link 89 is pivoted at 91 to an extension 92 on the reinforcing flange 93 of the casting 16 which fits within the elongated slot 15 in the lamp casing 13. It will be noted that when the flexible tube 76 is reciprocated, it imparts a similar movement with practically no lost motion to the plunger 84, push rod 87 and to the link 89 which tilts the rear of the lamp down and the front of the lamp up and the reverse as the case may be.

For the purpose of rotating and oscillating the flexible tube, I provide novel gearing means mounted in the casing 60 on the side of the steering column shown in Figures 7 to 10, inclusive and Figures 2 and 3.

The flexible shaft 76 is attached as shown in Figure 10 to one end of a cylinder 94 which is designed to reciprocate through the casing lid 95 and through the cylindrical extension 96 of the gear 97, but is prevented from relative rotary movement with respect to the gear, by means of a key 98 integral with the cylinder 94 which rides in a groove 99 in the member 96. The rear side of the gear 97 is seated against a portion 100 of the casing and this gear is rotated by the pinion 101 on the shaft 102 which is provided with a knurled knob 103. It is therefore apparent that by the rotation of the knob 103, the lamp is rotated, and as the pinion 101 is much smaller than the beveled gear 97, the knob 103 may be turned easily and relatively fine adjustment of the position of the lamp is obtained.

A cylindrical rack 104 is formed integral with the cylinder 94 and the same is engaged by a pinion 105 which is integral with the shaft 106 onto one end of which the gear 107 is secured. The gear 108 on the shaft 109 engages and rotates the gear 107 which in turn, reciprocates the rack 104. A knob 110 is suitably secured to the shaft 109 and it will be noted that through the gear frame described, the lamp may be tilted by the rotation of the knob 110 and it will also be noted that the gear reduction is such that the lamp may be adjusted very accurately and the likelihood of jarring out of place is minimized. The journal 111 in which the pinion 105 rotates is formed integral with the cover plate 95 on one side of the boss 112. This arrangement holds the gears in proper relation to each other when the cover plate is held in place by the screws 113. A conical member 114 is placed on the shaft 106 and a spring 115 fits within the member 114 and engages a shoulder 116 therein for holding the same to the right, as shown in Figure 9 and urging the shaft 106 to the left by engagement with a pin 117 which passes through the same.

Electric energy is transmitted to the lamp through the conductor 54 which passes through the switch 118 of any conventional type, which is operated by the oscillatory lever 119. A groove 120 in one side of the clamping member 121 is provided for the accommodation of the wire 54. The clamping members 121 and 122 are held about the steering column 123 by means of set screws 124 which firmly hold the gear casing in a convenient place on the steering column for operation by the driver and preferably in a position just beneath the steering wheel 125 as shown in Figure 1.

As shown in Figures 5 and 11, the lamp is mounted to be tilted on a horizontal axis consisting of pins 127 passing through upwardly extending lugs 128 on the pedestal 63 and similar lugs 129 on the reinforcing flange 93 of the casting 16.

For the purpose of retaining lubrication on the flexible tube, I preferably provide a suitable casing 126 shown in Figure 5 and held in place about the end of the cylinder 94 and the end of the plunger 84.

The operation of the lamp has been set forth in detail as the description thereof has proceeded and it is believed that further explanation is unnecessary. I do not intend to be limited by the specific details herein illustrated and described, but desire to avail myself of such variations and modifications as come within the scope of the appended claims.

I claim:

1. A device of the class described comprising in combination an electric lamp, means for rotating said lamp comprising a flexible tube operatively connected therewith, a rigid guiding member within said tube, means for rotating said tube, an electric conductor passing through said guiding means to said lamp, a terminal on said conductor, a socket in said lamp, conducting members between said socket and said terminal, comprising a resilient member having sliding contact with said terminal for permitting relative rotary motion, and arms conductively associating said members with said socket.

2. A device of the class described comprising in combination a lamp, a horizontal axis for said lamp and a vertical axis for said lamp, mechanism for rotating said lamp on its vertical axis and oscillating said lamp on its horizontal axis comprising a flexible tube, a rigid guide member within said flexible tube, a plunger operatively connecting said tube to said lamp for rotating said lamp when said tube is rotated and for oscillating said lamp when said tube is reciprocated, a cylinder operatively secured to said tube, a rack on said cylinder, gear reduction mechanism for reciprocating said rack, and gearing mechanism for rotating said cylinder.

3. A device of the class described comprising in combination a lamp, a rotatable pedestal therefor, mounting means for said pedestal, comprising a support provided with a concave under side, a convex member adjustably engaging in said concave portion of said support, a cylindrical extension on said support passing through an opening in said contact member, a cylinder in said pedestal extending down through said support, means on the lower end of said cylinder engaging the lower end of said cylindrical extension, for preventing the displacement thereof and means for retaining said support in adjusted position.

4. A device of the class described comprising in combination a lamp, a rotatable pedestal therefor, mounting means for said pedestal comprising a support provided with a concave under side, a convex member adjustably engaging said concave portion of said support, a cylindrical extension on said support passing through an opening in said convex member, a cylinder in said pedestal extending down through said support, means on the lower end of said cylinder engaging the lower end of said cylindrical extension, for preventing the displacement thereof, means for retaining said support in adjusted position, said means comprising a disc having threaded engagement with said cylindrical extension and thumb screws passing through said disc and engaging beneath said contact member.

5. A device of the class described comprising in combination a lamp, mechanism for rotating said lamp, comprising a flexible tube composed of a series of universal joint links, having openings through the body portion thereof, a rigid member extending through said tube for guiding the same, and means operatively connected with said tube for rotating the same.

6. In a device of the class described, a lamp mounted for movement on a horizontal axis and a vertical axis, a rigid guide tube extending into the lamp, a bulb receiving socket in the lamp and comprising a contact element, an electrical conductor extending through the tube, electrical connections between the conductor and the contact member permitting movement of the lamp about both axes, an operating member mounted upon the tube, and operating connections between said member and the lamp for adjusting the latter about both axes.

7. In a device of the class described, a lamp mounted for movement on a horizontal axis and a vertical axis, a rigid guide tube extending into the lamp, a bulb receiving socket in the lamp and comprising a contact element, an electrical conductor extending through the tube, a terminal member secured upon the end of the conductor within the lamp, electrical connections between the terminal member and the contact element, said connections comprising yielding members connected to the terminal member for relative turning movement, an operating member mounted upon the tube, and operating connections between the operating member and the lamp for adjusting the latter about both axes.

8. In a device of the class described, a lamp mounted for movement on a horizontal and a vertical axis, a plunger mounted for axial movement and turning movement, operating connections between said plunger and the lamp, an operating member attached at one end to the plunger, a gear, the other end of the operating member being connected to the gear for turning movement therewith and having relative sliding movement axially of the gear, means for rotating said gear, and means for adjusting the operating member lengthwise.

9. In a device of the class described, a lamp mounted for movement on a horizontal and a vertical axis, a plunger mounted for axial movement and turning movement, operating connections between said plunger and the lamp, an operating member attached at one end to the plunger, a gear, a cylinder slidably mounted in the gear and feathered thereto for turning movement therewith, said cylinder being secured to the other end of the operating member and provided with a rack, means for rotating said gear, and a second gear meshing with the rack for adjusting the cylinder lengthwise.

In witness whereof I hereunto subscribe my name this twelfth day of March, 1928.

JOHN S. GULLBORG.